Aug. 16, 1949.    V. W. PECORONI ET AL    2,479,400
METHOD OF FORMING COIL ASSEMBLIES
Filed June 15, 1948
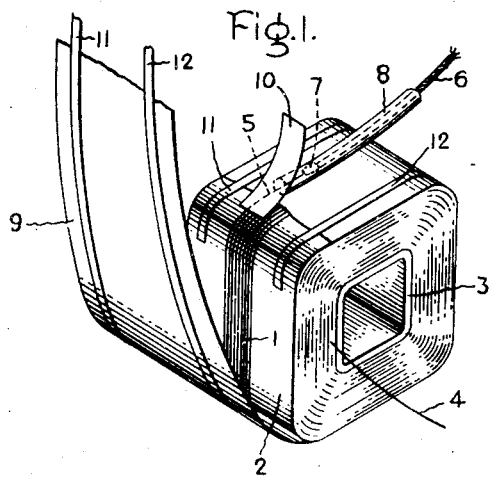
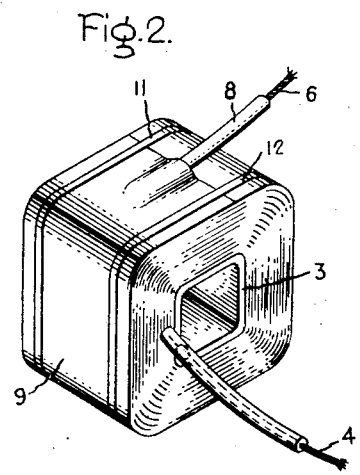
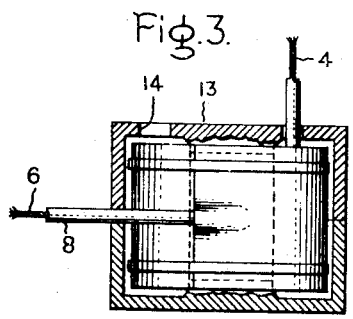
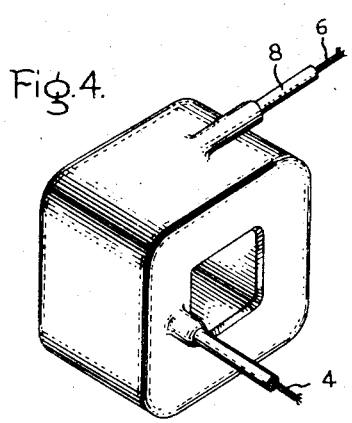
Inventors:
Valentine W. Pecoroni,
Richard B. Gethmann,
by *Morton D. ...*
Their Attorney.

Patented Aug. 16, 1949

2,479,400

UNITED STATES PATENT OFFICE 2,479,400

METHOD OF FORMING COIL ASSEMBLIES

Valentine W. Pecoroni, Bridgeport, Conn., and Richard B. Gethmann, Fayetteville, N. Y., assignors to General Electric Company, a corporation of New York Application June 15, 1948, Serial No. 33,094

3 Claims. (Cl. 154—80)

This invention relates to improved electrical coil assemblies, and more particularly to a process for constructing such improved coils for use in radio system transformers, cathode-ray tube deflection coils, and the like.

It is an object of this invention to provide a process for constructing an improved coil assembly capable of withstanding relatively high potential surges, and in which the dielectric properties are such that the distributed capacity of the coil is materially reduced, and the assembly may be used at high frequencies.

A still further object of this invention is to provide a process for constructing an improved coil assembly capable of withstanding rough usage and which is impervious to moisture.

Yet another object of this invention is to provide a process for the manufacture of improved coil assemblies, the assemblies being hermetically sealed, and also insulated against high potential breakdown and corona effects.

A still further object of this invention is to provide such a process for the manufacture of improved coil assemblies utilizing a thermoplastic material as the insulating and sealing means, and whereby the possibility of air holes forming in the plastic during the manufacturing process is precluded.

A still further object of this invention is to provide such a manufacturing process which is efficient, rapid and highly economical.

The features of this invention which are believed to be new are set forth with particularity in the appended claims. The invention itself, however, together with further objects and advantages thereof may best be understood by reference to the accompanying drawing in which, Fig. 1 shows the coil assembly in the process of being assembled, Fig. 2 shows the assembled coil prior to being placed in a mold, Fig. 3 shows the assembly placed in a mold and Fig. 4 shows the completed coil.

This invention contemplates a process for the manufacture of improved coil assemblies, which comprises winding an electrical conductor and a strip of plastic sheet together about a coil form in such a manner that each layer of the conductors is separated from a succeeding layer by the plastic sheet, a sufficient margin of the sheet being allowed to extend beyond the layers of conductors. It has been found preferable to wind one or more layers of plastic sheet about the coil form under the first layer of conductors, the outer layers of conductors being similarly covered with further layers of the plastic sheet. Adhesive tape is used to secure the coil, and the assembly is then placed in a mold and molten thermoplastic material is injected into the mold so that it completely surrounds the coil.

Referring now to Fig. 1, conductor layers 1 are shown to be interleaved by a strip or sheets 2 of a plastic material, the conductor and the plastic sheets being wound about a coil form 3. The material of sheets 2 may comprise any suitable thermoplastic material which has good electrical properties such as, for example, polyethylene, polystyrene, polytetrafluoroethylene, or cellulose ethers or esters. It can be seen that the plastic sheets 2 extend longitudinally a substantial distance beyond the conductor layers 1. One end of the winding is brought out of the assembly by conductor 4, and the other end by conductor 5. Conductor 5 is connected to a lead 6 by means of a soldered joint 7. Lead 6 may be any conventional lead-in wire, and is insulated by insulation 8, this insulation being slipped over soldered joint 7, as shown. A final strip or sheet 9 of the plastic material, which may comprise several layers, has one end slipped under conductor 5, joint 7 and lead 6. A strip of adhesive tape 10 is placed over the exposed layer of conductor 1 and pressed into place over lead 6, joint 7 and one end of strip 9, holding these components firmly in place. The other end of the plastic strip 9 is brought around the coil and overlaps the first-mentioned end of this strip, and thereby covers joint 7, strip 10 and a portion of lead 6. Two narrow strips of adhesive tape 11 and 12 are wound about the strip 9, securing the assembly.

Referring now to Fig. 2, this figure shows the coil with the final strip of plastic material 9 completely surrounding the assembly and secured by adhesive strips 11 and 12. The assembly may now be placed in a mold, in accordance with the succeeding stage of the process.

Referring now to Fig. 3, this figure shows the assembly of Fig. 2 placed in a mold 13. Mold 13 may be in two sections and has the form shown in Fig. 3, whereby molten plastic may be injected into the mold through aperture 14, the molten plastic completely surrounding the layers of conductors and plastic sheets which comprise the coil assembly.

The plastic material injected into the mold may comprise any suitable thermoplastic material, for example, polyethylene, polystyrene, or cellulose ethers and esters, which preferably coalesces with the material of sheets 2. When polyethylene is utilized as the injected material, the mold 13 has a temperature of substantially 140° F., and molten polyethylene is injected through aperture 14 into the mold at a temperature of substantially 550° F., and at a pressure of substantially 2,000 pounds per square inch. The pressure employed preferably is sufficiently low that the arrangement of the conductor layers, and the plastic sheets 2 is not disturbed to an appreciable extent.

After the injection operation, the assembly is allowed to cool, and the coil is removed from the mold. The finished coil has the appearance as shown in Fig. 4, wherein the molten plastic has solidified and formed a hermetically sealed sheath for the assembly.

When a molding time of approximately 30 seconds is used, the injected thermoplastic material fuses or coalesces with the plastic sheets of the coil, hermetically sealing the assembly. At the same time the plastic material between the conductor layers remains in sheet form. It has been found that the presence of these sheets, together with the relatively low injection pressure used in the process, prevents the conductor layers in the coil from shifting during the process, and also precludes the possibility of air holes forming in the plastic insulation.

The invention therefore provides a simple, efficient, rapid and highly economical process for the manufacture of electrical coil assemblies, whereby the resulting coils are pleasing in appearance, rugged, hermetically sealed and impervious to moisture.

While a certain specific embodiment has been shown and described, it will of course be understood that various modifications may be made without departing from the invention. The appended claims are therefore intended to cover any such modifications that fall within the true spirit and scope of the invention.

What we claim as new and desire to secure by Letters Patent of the United States is:

1. A process for constructing electrical coil assemblies which comprises winding an electrical coil having a plurality of layers of conductors, interleaving said layers with strips of a thermoplastic material, allowing a substantial margin of said strips to extend longitudinally beyond the layers of said conductors, placing said coil in a mold, injecting molten thermoplastic material into said mold to cause said molten thermoplastic material to surround said assembly, and allowing said assembly to cool, whereby said molten plastic material solidifies and fuses with said plastic strips hermetically sealing said assembly.

2. A process for constructing electrical coil assemblies which comprises winding an electrical coil having a plurality of layers of conductors, interleaving said layers with strips of polyethylene, allowing a substantial margin of said strips to extend longitudinally beyond the layers of said conductors, placing said coil in a mold, injecting molten polyethylene at relatively low pressure into said mold to cause said molten polyethylene to surround completely said assembly, and allowing said assembly to cool in said mold, whereby said molten polyethylene solidifies and fuses with said polyethylene strips, hermetically sealing said assembly.

3. A process for constructing electrical coil assemblies which comprises winding a plurality of layers of polyethylene about a coil form, winding an electrical coil having a plurality of layers of turns concurrently with strips of polyethylene about said first-mentioned polyethylene layers so that said strips are interleaved between said layers of turns, allowing a substantial margin of said strips to extend longitudinally of said layers of turns, connecting lead wires to the extremities of said coil, winding a further layer of polyethylene about said assembly, securing said assembly with adhesive tape, placing said assembly in a mold, injecting into said mold polyethylene at a temperature of substantially 550° F. and at a pressure of substantially 2,000 pounds per square inch to cause said injected polyethylene completely to surround said assembly, cooling said assembly and removing said mold, whereby said injected polyethylene solidifies hermetically sealing said assembly and fusing with said layers of polyethylene.

VALENTINE W. PECORONI.
RICHARD B. GETHMANN.

REFERENCES CITED

The following references are of record in the file of this patent:

UNITED STATES PATENTS

| Number | Name | Date |
|---|---|---|
| 1,326,366 | Milton | Dec. 30, 1919 |
| 1,495,823 | Underhill | May 27, 1924 |
| 1,505,600 | Pickard | Aug. 19, 1924 |
| 1,633,577 | Franks | June 28, 1927 |
| 2,177,266 | Schupp | Oct. 24, 1939 |
| 2,206,720 | Ducati | July 2, 1940 |

FOREIGN PATENTS

| Number | Country | Date |
|---|---|---|
| 595,657 | Great Britain | Dec. 11, 1947 |